United States Patent
Banerjee et al.

(10) Patent No.: US 10,291,654 B2
(45) Date of Patent: May 14, 2019

(54) AUTOMATED CONSTRUCTION OF NETWORK WHITELISTS USING HOST-BASED SECURITY CONTROLS

(71) Applicant: Symantec Corporation, Mountain View, CA (US)

(72) Inventors: Deb Banerjee, Cupertino, CA (US); Susan Hassall, Brookeville, MD (US)

(73) Assignee: Symantec Corporation, Mountain View, CA (US)

( * ) Notice: Subject to any disclaimer, the term of this patent is extended or adjusted under 35 U.S.C. 154(b) by 16 days.

(21) Appl. No.: 14/871,800

(22) Filed: Sep. 30, 2015

(65) Prior Publication Data

US 2017/0093918 A1 Mar. 30, 2017

(51) Int. Cl.
*G06F 21/55* (2013.01)
*H04L 12/24* (2006.01)
*H04L 29/06* (2006.01)

(52) U.S. Cl.
CPC ............ *H04L 63/20* (2013.01); *G06F 21/552* (2013.01); *H04L 41/0853* (2013.01); *H04L 63/101* (2013.01); *H04L 63/1408* (2013.01); *H04L 63/1425* (2013.01); *H04L 41/046* (2013.01)

(58) Field of Classification Search
CPC ... H04L 63/20; H04L 63/101; H04L 63/1416; H04L 63/1425; H04L 63/145; H04L 63/1441; H04L 63/1408
See application file for complete search history.

(56) References Cited

U.S. PATENT DOCUMENTS

| | | | | |
|---|---|---|---|---|
| 7,793,138 B2* | 9/2010 | Rastogi | ............... | H04L 67/1097 714/4.1 |
| 8,230,505 B1* | 7/2012 | Ahrens | .................. | G06Q 10/02 705/5 |
| 8,544,060 B1* | 9/2013 | Khetawat | ............... | H04L 63/20 713/165 |
| 8,645,683 B1* | 2/2014 | Emigh | .................. | H04L 63/123 709/218 |
| 8,959,633 B1* | 2/2015 | Dokey | .................... | G06F 21/50 705/30 |
| 9,736,182 B1* | 8/2017 | Madhukar | ............... | H04L 63/20 |

(Continued)

OTHER PUBLICATIONS

International Search Report dated Aug. 4, 2016, PCT/US2016/038494, pp. 1-5.

*Primary Examiner* — Tae K Kim
(74) *Attorney, Agent, or Firm* — Patterson + Sheridan, LLP

(57) ABSTRACT

Techniques are disclosed for constructing network whitelists in server endpoints using host-based security controls. Once constructed, the network whitelists are used to detect unauthorized communications at the server endpoints. In one embodiment, a method is disclosed for constructing a network whitelist. The method includes identifying at least a first application hosted on a computing system. The method also includes inspecting one or more configuration files associated with the first application to identify one or more configuration settings that specify how the first application communicates with one or more second applications. The method further includes generating a whitelist that specifies expected network communications activity for the first application, based on the configuration settings.

20 Claims, 8 Drawing Sheets

Network Whitelist 600

| Source Process | Source IP | Source Port | Destination Process | Destination IP | Destination Port | Protocol |
|---|---|---|---|---|---|---|
| WebServer 502 | 1.1.1.0 | 80 | AppServer 508 | 1.1.1.4 | 80 | TCP |
| WebServer 502 | 1.1.1.0 | 80 | AppServer 504 | 1.1.1.1 | 80 | TCP |
| AppServer 504 | 1.1.1.1 | 85 | WebServer 502 | 1.1.1.0 | 85 | TCP |
| AppServer 504 | 1.1.1.1 | 90 | mySQL DB 506 | 1.1.1.2 | 90 | TCP |
| mySQL DB 506 | 1.1.1.2 | 95 | AppServer 504 | 1.1.1.1 | 95 | TCP |
| AppServer 508 | 1.1.1.4 | 100 | WebServer 502 | 1.1.1.0 | 100 | TCP |
| AppServer 508 | 1.1.1.4 | 105 | Scripting Engine 510 | 1.1.1.5 | 105 | TCP |
| AppServer 508 | 1.1.1.4 | 110 | Oracle DB 506 | 1.1.1.3 | 110 | TCP |
| Oracle DB 506 | 1.1.1.3 | 115 | AppServer 508 | 1.1.1.4 | 115 | TCP |
| Scripting Engine 510 | 1.1.1.5 | 120 | AppServer 508 | 1.1.1.4 | 120 | TCP |

(56) References Cited

U.S. PATENT DOCUMENTS

| | | | |
|---|---|---|---|
| 2004/0078591 A1* | 4/2004 | Teixeira | G06F 21/554 726/4 |
| 2004/0193906 A1* | 9/2004 | Dar | H04L 29/06 726/13 |
| 2006/0195896 A1* | 8/2006 | Fulp | H04L 63/0218 726/11 |
| 2007/0043943 A1* | 2/2007 | Peretti | H04L 63/105 713/167 |
| 2008/0077995 A1* | 3/2008 | Curnyn | H04L 63/1416 726/27 |
| 2008/0159175 A1 | 7/2008 | Flack | |
| 2009/0210929 A1* | 8/2009 | Zill | H04L 63/0227 726/4 |
| 2011/0099633 A1* | 4/2011 | Aziz | G06F 21/568 726/24 |
| 2012/0278886 A1* | 11/2012 | Luna | G06F 21/552 726/22 |
| 2012/0291102 A1* | 11/2012 | Cohen | G06F 21/57 726/4 |
| 2012/0291103 A1* | 11/2012 | Cohen | G06F 21/6218 726/4 |
| 2013/0185795 A1* | 7/2013 | Winn | H04L 63/0236 726/23 |
| 2013/0298184 A1* | 11/2013 | Ermagan | G06F 21/54 726/1 |
| 2013/0347111 A1* | 12/2013 | Karta | H04L 63/1441 726/23 |
| 2014/0201838 A1* | 7/2014 | Varsanyi | G06F 21/552 726/23 |
| 2014/0245376 A1* | 8/2014 | Hibbert | H04L 63/1433 726/1 |
| 2014/0259090 A1* | 9/2014 | Ingersoll | H04L 63/20 726/1 |
| 2014/0310408 A1* | 10/2014 | Kirner | H04L 41/082 709/224 |
| 2015/0040217 A1* | 2/2015 | Abuelsaad | H04L 63/1408 726/22 |
| 2015/0067764 A1* | 3/2015 | Kim | H04L 63/0227 726/1 |
| 2015/0172300 A1* | 6/2015 | Cochenour | H04L 63/145 726/23 |
| 2015/0341362 A1* | 11/2015 | Dobson | H04L 67/2823 726/27 |
| 2016/0072834 A1* | 3/2016 | Bott | H04L 63/1425 726/1 |
| 2016/0323318 A1* | 11/2016 | Terrill | H04L 63/20 |
| 2016/0371472 A1* | 12/2016 | Walsh | H04L 63/102 |
| 2018/0225465 A1* | 8/2018 | Kiyokawa | G06F 21/62 |

* cited by examiner

Network Whitelist 600

| Source Process | Source IP | Source Port | Destination Process | Destination IP | Destination Port | Protocol |
|---|---|---|---|---|---|---|
| WebServer 502 | 1.1.1.0 | 80 | AppServer 508 | 1.1.1.4 | 80 | TCP |
| WebServer 502 | 1.1.1.0 | 80 | AppServer 504 | 1.1.1.1 | 80 | TCP |
| AppServer 504 | 1.1.1.1 | 85 | WebServer 502 | 1.1.1.0 | 85 | TCP |
| AppServer 504 | 1.1.1.1 | 90 | mySQL DB 506 | 1.1.1.2 | 90 | TCP |
| mySQL DB 506 | 1.1.1.2 | 95 | AppServer 504 | 1.1.1.1 | 95 | TCP |
| AppServer 508 | 1.1.1.4 | 100 | WebServer 502 | 1.1.1.0 | 100 | TCP |
| AppServer 508 | 1.1.1.4 | 105 | Scripting Engine 510 | 1.1.1.5 | 105 | TCP |
| AppServer 508 | 1.1.1.4 | 110 | Oracle DB 506 | 1.1.1.3 | 110 | TCP |
| Oracle DB 506 | 1.1.1.3 | 115 | AppServer 508 | 1.1.1.4 | 115 | TCP |
| Scripting Engine 510 | 1.1.1.5 | 120 | AppServer 508 | 1.1.1.4 | 120 | TCP |

FIGURE 6

AUTOMATED CONSTRUCTION OF NETWORK WHITELISTS USING HOST-BASED SECURITY CONTROLS

BACKGROUND

Field

Embodiments presented herein generally relate to techniques for generating network whitelists, and more specifically, to techniques for automating construction of network whitelists in server endpoints using host-based security controls.

Description of the Related Art

Computer networks continue to expand and users can access applications and data from virtually anywhere using a variety of computing devices (e.g., laptops, tablets, mobile telephones, etc.). As a result, enterprises (e.g., individuals, organizations, companies, etc.) find it increasingly difficult to prevent malicious actors from gaining access to a network, capturing sensitive information, and transferring the sensitive information from the network. For example, malicious actors often attempt to exploit system vulnerabilities, employ compromised credentials issued to authorized users, perform SQL injections, and use targeted malware (e.g., root kits, spyware, remote access tools, etc.) to access a given enterprise network. Thus, even with extensive defenses focused on preventing network intrusion, enterprises still face network breaches based on a variety of sophisticated hacking techniques. Once a network breach has occurred, malicious actors typically attempt to spread the malware to other systems and devices, collect sensitive information, and transfer the sensitive information from the network (e.g., to use for exploitative purposes), etc.

Further, enterprises today increasingly use cloud-based services to run applications and store data. Cloud-based computing services can provide a number of benefits to enterprises, including flexibility, reliability, low capitalization requirements, add-on services, data sharing, and centralized access to data. For example, organizations can quickly create or modify cloud-based computing instances on an as-needed basis to execute applications.

Currently, many of the tools used to prevent data exfiltration (e.g., the unauthorized transfer of data from a network) focus on monitoring network traffic, e.g., with the use of network-based security controls. These network-based security controls, however, are generally not available to an enterprise that uses cloud-based services to run applications, store data, etc. For example, enterprises generally do not have access or control over the physical hardware or network in cloud-based environments to implement network security controls.

SUMMARY

On embodiment presented herein describes a method for automating a construction of a network whitelist using host-based security controls. Once constructed, the whitelist is used to detect unauthorized communications. The method generally includes identifying at least a first application hosted on a computing system. The method also includes inspecting one or more configuration files associated with the first application to identify one or more configuration settings that specify how the first application communicates with one or more second applications. The method further includes generating a whitelist that specifies expected network communications activity for the first application, based on the configuration settings.

Another embodiment includes a computer-readable storage medium storing instructions, which, when executed on a processor, performs an operation. The operation generally includes identifying at least a first application hosted on a computing system. The operation also includes inspecting one or more configuration files associated with the first application to identify one or more configuration settings that specify how the first application communicates with one or more second applications. The operation further includes generating a whitelist that specifies expected network communications activity for the first application, based on the configuration settings.

Still another embodiment includes a system having a processor and a memory storing a program, which, when executed on the processor, performs an operation. The operation generally includes identifying at least a first application hosted on a computing system. The operation also includes inspecting one or more configuration files associated with the first application to identify one or more configuration settings that specify how the first application communicates with one or more second applications. The operation further includes generating a whitelist that specifies expected network communications activity for the first application, based on the configuration settings.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 6 illustrates an example network whitelist generated based on configuration files for the computing instances in FIG. 5, according to one embodiment.

DETAILED DESCRIPTION

Figure 1:
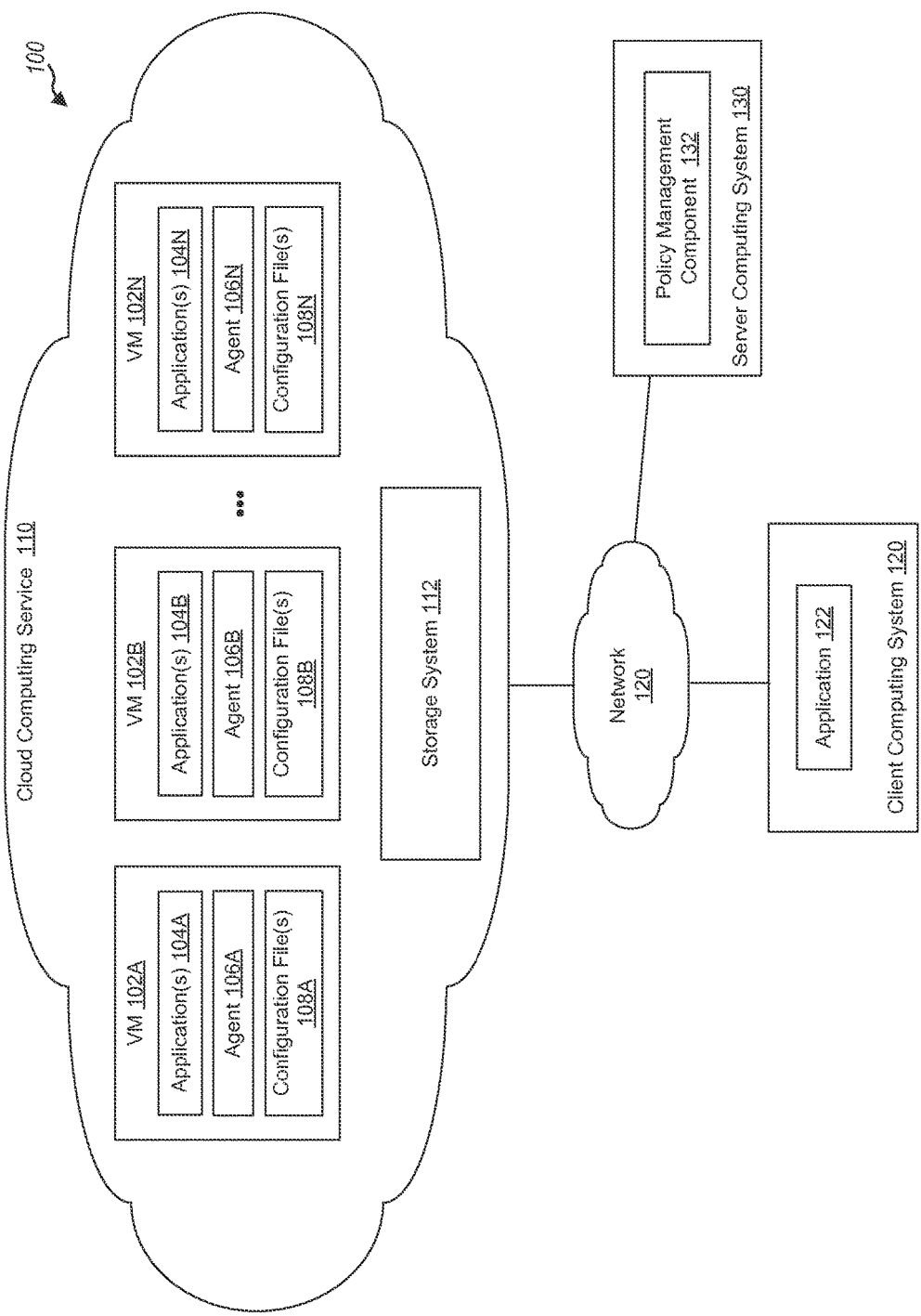
FIG. 1 illustrates an example computing environment, according to one embodiment.

Many network security tools, such as intrusion detection systems, intrusion prevention systems, firewalls, security policies, etc., exist today for preventing access to networks. However, relatively few tools exist that prevent the spread of an infection to other systems in the network and/or prevent sensitive information from leaving a network. Such sensitive information can include customer data, financial information, trade secrets, proprietary corporate data, top secret information, national security information, etc.

Traditional approaches for preventing data exfiltration generally focus on inspecting outgoing traffic, and monitoring for the transfer of sensitive information, e.g., with the use of data loss prevention systems. Such approaches typically install such systems at network egress points near the perimeter of an enterprise network, and use the systems to analyze network traffic to detect sensitive data that may be sent in violation of information security policies. To detect sensitive data, traditional approaches generally focus on detecting attributes and data of sensitive files and monitoring for the transfer such information in order to detect a potential data leak. For example, such approaches typically use tools to enumerate files based on file names and hashes, and examine the signatures when inspecting outgoing traffic. Such approaches, however, can be easily overcome by attackers, and therefore, are insufficient at preventing data exfiltration. In addition, these traditional approaches are generally not available to an enterprise that uses cloud-based computing services. For example, with cloud-based computing services, enterprises may not have capability, access, control, etc. to install necessary hardware and/or software needed to inspect and analyze network traffic.

Embodiments presented herein provide techniques for constructing network whitelists using host-based security controls. Once constructed, the network whitelist can be used to detect anomalies, such as unauthorized attempts to transfer sensitive information from the enterprise, attempts to spread malware to other systems or devices in the enterprise, etc. In one embodiment, an enterprise can use a cloud computing service to provide resources and/or execute applications for end-users within the enterprise. For example, the cloud computing service can allocate application components on one or more cloud computing instances hosted within the cloud computing service to execute application(s) for end-users within the enterprise.

In one embodiment, a whitelist agent is deployed to each cloud computing instance hosted within the cloud computing service. Each whitelist agent can determine what applications are present on a given computing instance, such as a virtual machine instanced, containers running a virtual machine, etc. For example, the whitelist agent(s) can determine what web servers, application servers, databases, scripting engines, etc., deployed to the computing instance, are used for executing an application for an end-user. Once determined, the whitelist agents can inspect configuration files for the applications to identify properties or configuration data associated with a given application. For example, in one embodiment, the properties can specify information such as a web server may connect to a database server at a particular network address and port specified in the configuration file for the web server (e.g., "webserver config." indicates "Name: Webserver" is configured to communicate with "Name: DBServer" at "DBServer address: localhost" on "DBServer port: 80," etc.). In one embodiment, the whitelist agent sends this information to a policy management server which constructs a whitelist. Once constructed, the whitelist can be returned to the agent on a given virtual machine, and the agent can use the whitelist to evaluate network communication generated by the application. For example, in one embodiment, once the whitelist agent determines that a network communication is directed to an address that is not on the constructed whitelist, the whitelist agent can prevent the communication or raise an alert (e.g., to an administrator or end-user).

As such, techniques presented herein allow a process-aware network whitelist to be constructed, which can lower the back-end burden of generating alerts, and thereby minimize number of false positives generated (relative to traditional techniques).

Note that, in the following description, many of the following embodiments are described using virtual machines, containers, etc., deployed to a cloud-based environment as reference examples of computing systems that can be used with the techniques described herein. One of ordinary skill in the art, however, will recognize that the embodiments presented herein may be adapted to work with other environments, e.g., on-premises environments, such as data centers, private clouds, and the like.

FIG. 1 illustrates an example computing environment 100, according to one embodiment. As shown, the computing environment 100 includes client computing system 120 and server computing system 130 connected to cloud computing service 110 via network 120. The network 120, in general, may be a wide area network (WAN), local area network (LAN), wireless LAN (WLAN), personal area network (PAN), power line communications (PLC), a cellular network, etc. In a particular embodiment, the network 120 is the Internet. Client computing system 120 and server computing system 130 can be any kind of physical computing system having a network interface such as a desktop computer, laptop computer, mobile device, tablet computer, server, embedded systems, etc.

The cloud computing service 110 is configured to host one or more cloud computing instances. In general, however, the cloud computing service 110 represents any type or form of computing system that is capable of providing online hosting of virtual machine instances, applications, services, web services, or storage, etc. A cloud computing instance, in general, can refer to any unit of computational resources that may be provided by a cloud computing service and that may store data on the cloud computing service. In some examples, a cloud computing instance can refer to a virtual machine (VM) provisioned within the cloud computing service (e.g., onto which a user may install an application that may store data on the cloud computing service). In some examples, a cloud computing instance can refer to a virtual container(s) (on a host machine) onto which the user can install applications.

The cloud computing service 110 can provide computing resources (e.g., processing devices, host machines, virtual machines, applications, etc.), storage resources (e.g., storage systems, storage servers, physical disks, logical disks, etc.), and networking resources (e.g., network interface cards, ports, routers, switches, etc.) to one or more entities on a subscription basis. The cloud network 110 can be implemented as a Software-as-a-Service (SaaS) system, Infrastructure-as-a-Service (IaaS) system, Platform-as-a-service (PaaS) system, etc. In some embodiments, cloud network 110 can provide one or more clients (e.g., such as client computing system 120) with a view of applications and data without providing the client complete access to all underlying systems.

As shown, the cloud network 110 includes one or more cloud computing instances (e.g., such as virtual machine (VM) instances 102A-102N) and storage system 112. Storage system 112 can include one or more storage devices, such as an array of physical disks, storage servers, virtual disks, databases, etc. The VM instances 102A-102N can be distributed across one or more physical machines, such as a server, desktop computer or other physical computing device.

Each VM 102 hosts an application(s) 104, which, in general, is a collection of cloud resources for a specified task and can refer to one or more application components executing on one or more VMs 102A-N. Note, that for the sake of convenience, the following description uses web servers, application servers, databases (e.g., MySQL databases, Oracle databases, etc.), scripting engines, etc., as reference examples of application(s) 104 that can be hosted across VMs 102 to support a web application for an end-user. However, one of ordinary skill in the art will understand that the techniques presented herein can be used with other types of application(s) 104. For example, in some cases, application(s) 104 could refer to software utilities, such as CRON, etc., that schedule jobs and other tasks in cloud computing service 110, network time protocol (NTP) applications configured to synchronize the time of a client to a server or reference time source, database query software applications, etc.

Examples of web servers can include, but are not limited to, Apache HTTP Server, Microsoft Internet Information Services (IIS), Nginx, etc. Examples of application servers can include, but are not limited to, Apache TomCat (e.g., based on Java), AppServers based on PHP, and the like. Scripting engines, in general, refer to engines for running scripts built with scripting languages, examples of which include PHP, JavaScript, etc.

Applications 104A-N can use any one of the storage resources within storage system 112 to perform tasks or operations. In one embodiment, the applications 104A-104N are used to execute applications (such as application 122) for end-users within an enterprise. For example, to execute the application 122, the client computing system 120 can request the cloud computing service 110 to launch one or more VMs 102A-102N, and, within the VMs, one or more applications 104, storage devices, etc. can be used to execute the application 122. The application 122, in general, can be any application, including for example, a web application, desktop application, browser application, a multi-tier application, etc.

As shown, each VM 102 also includes a whitelist agent 106 and configuration file(s) 108. Whitelist agents 106A-106N are configured to perform one or more of the techniques presented herein. In one embodiment, each whitelist agent 106A-N is a collection of code that is executed within each VM 102A-102N. In one embodiment, the whitelist agents 106A-106N can identify which applications 104A-104N are used for executing an application 122 (of client computing system 120) for an end-user. For example, such applications 104A-104N can include web servers, application servers, databases, etc. used to support a multi-tier web application, such as an e-commerce web application.

Once the whitelist agents 106A-106N identify the application(s) 104A-104N, the whitelist agents 106A-106N can inspect configuration files 108A-108N to identify properties or configuration data associated with applications 104A-104N. For example, the configuration files 108A-108N can indicate how a given application is configured to communicate with another application(s) on the same VM 102 and/or across VMs 102. In one embodiment, the configuration files 108 can indicate network communication used by applications 104 associated with the execution of the application 122. For example, a configuration file for a web server (e.g., "Webserver.config") can indicate that the web server (e.g., Apache) is configured to communicate with an application server (e.g., TomCat) at AppServer address (e.g., "localhost") and AppServer port (e.g., "8080"). The configuration file can indicate that the WebServer is configured to communicate with the AppServer upon a request from a user to process financial data associated with an e-commerce application. In one embodiment, the configuration files 108A-108N can indicate process hierarchy (e.g., regarding how a process originates from parent process to child process), process path (e.g., processes that make the endpoints of the network traffic), command line arguments, user groups, and the like.

Alternatively, or additionally, in another embodiment, as will be described below, the whitelist agents 106A-106N can inspect scripting configuration files (e.g., devOPs scripting files, and the like) that are used to create multi-tier environments, etc. for multi-tier applications within the cloud computing service 110. The whitelist agents 106A-106N can parse the scripting configuration files, re-construct the structure of a particular application and determine connectivity information, based on properties of the scripting configuration files.

In one embodiment, once the whitelist agents 106A-106N inspect the configuration files 108-108N, the whitelist agents 106A-106N can send the information from the configuration files to the policy management component 132, which constructs a whitelist based on the information. For example, in one embodiment, the policy management component 132 can construct a five tuple whitelist (e.g., with source IP/port, destination IP/port, and protocol) based on the inspection of the configuration files. In one embodiment, the policy management component 132 can construct a process-aware whitelist, such as that shown in FIG. 6, with source/destination process, source IP/port, destination IP/port, and protocol). In other embodiments, the policy management component 132 can include any information from the configuration files 108A-108N within the constructed whitelist.

Once the policy management component 132 constructs the whitelist, the policy management component 132 sends the constructed whitelist back to each of the whitelist agents 106A-106N, which evaluate network communications generated by the applications 104 within the respective VMs. For example, the whitelist agents 106A-106N can monitor network communications between the applications 104 according to the constructed whitelist. Upon detecting a network communication attempt that deviates from the whitelist, the whitelist agents 106A-106N can raise an alert and/or prevent the network communication attempt, based on a policy associated with each host (e.g., each VM 102). For example, using the reference example above, a whitelist agent 106 can evaluate network communication generated by a web server, application server, etc. (used to support an e-commerce application), using a constructed whitelist. In one example, if the whitelist agent 106 determines that the web server is attempting to communicate with an application server at an address (or port) that is not on the whitelist, attempting to communicate with another application (or process) that is not on the whitelist, attempting to communicate using a protocol that is not on the whitelist, etc., the whitelist agent 106 can prevent the network communication attempt and/or raise an alert. In general, the whitelist agent 106 can prevent any network communication attempt and/or raise an alert for any network communication attempt that deviates from any of the allowed criteria in the whitelist.

In this manner, the techniques presented herein allow for constructing a process-aware whitelist, which can be used for anomaly detection, using host-based security controls (e.g., as compared to traditional network security controls). As described in more detail below, the constructed whitelist can lower the back-end of generating alerts, and thereby minimize false positives.

In one embodiment, the whitelist agents 106A-106N can inspect network architecture, firewalls, network access control lists, etc. in addition to inspecting configuration files to identify additional network traffic expected patterns between the applications 104. For example, as described below, the whitelist agents can let the applications operate for a period of time and monitor network communications between the applications 104 to identify actual and/or expected patterns of network communication. Note, however, that FIG. 1 illustrates merely one possible arrangement of the computing environment 100. For example, although the server computing system 130 is shown separate from the cloud computing system 110, in some embodiments, the server computing system 130 could be deployed as another computing instance (e.g., such one of the VMs 102A-N) on one of the physical devices within the cloud computing service 110. In such a configuration, the whitelist agents 106A-106N would send the information from the configuration files to the respective VM instance for construction of the whitelist. More generally, one of ordinary skill in the art will recognize that other embodiments of the computing environment 100 can also be configured to provide automated construction of whitelists for anomaly detection, using host-based security controls.

Figure 2:
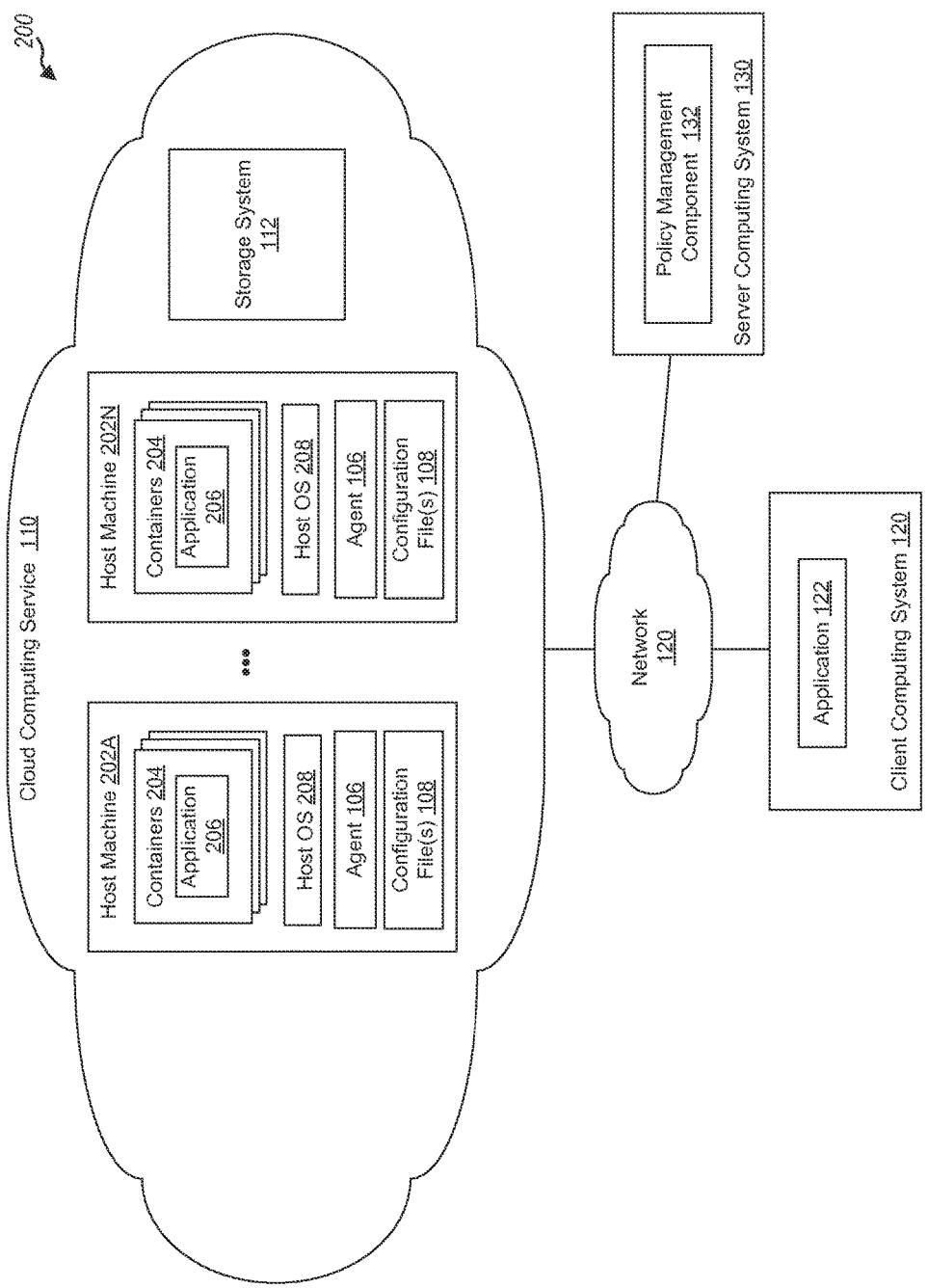
FIG. 2 illustrates another example computing environment, according to one embodiment.

FIG. 2 illustrates another example computing environment 200, according to one embodiment. Note that many of the components (e.g., agent 106, configuration files 108, storages system 112, network 120, client computing system 120, server computing system 130, etc.) of the computing environment 200 have same or similar functions as their corresponding components described relative to FIG. 1. Therefore, for the sake of convenience, these functions (where the same) may not be described again below in the description.

As shown, in this embodiment, the cloud computing service 210 includes host machines 202A-202N, which in general can be any kind of physical computing system having a network interface such as a desktop computer, laptop computer, mobile device, tablet computer, server, embedded systems, etc. Each host machine 202 includes a plurality of containers 204, a host operating system (OS) 208, an agent 106 and configuration file(s) 108. Each container 204 can run an application(s) 206, examples of which can include webserver applications, application servers, database applications, etc. In one embodiment, each host machine can support 150 containers. In one embodiment, the distribution of a plurality of containers across one or more host machines is an example of a Docker environment.

Note, however, that FIG. 2 illustrates merely one possible arrangement of the computing environment 200. More generally, one of ordinary skill in the art will recognize that other embodiments of the computing environment 200 can also be configured to use host-based security controls to construct network whitelists. For example, in some embodiments, the cloud computing service could include a plurality of computing instances, some of which may include VMs distributed across one or more physical computing devices, and some of which may include a plurality of containers within one or more host machines (e.g., physical computing devices).

Figure 3:
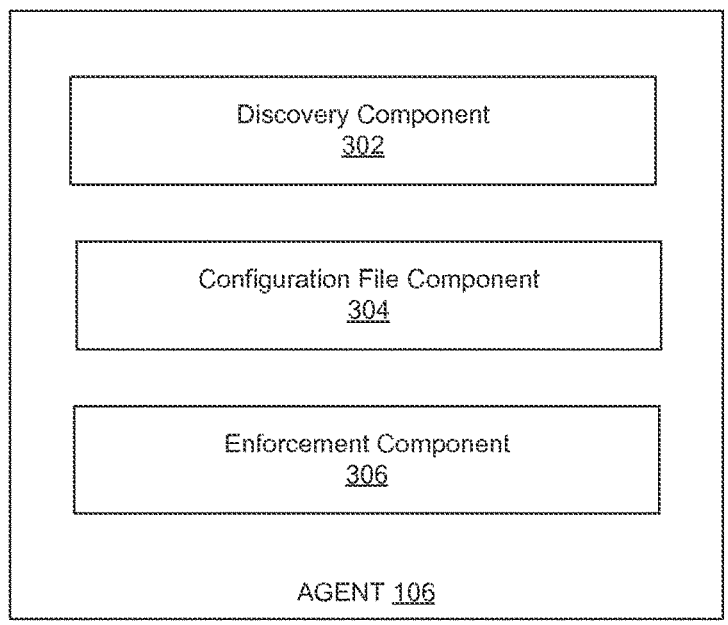
FIG. 3 illustrates an example whitelist agent configured to inspect configuration files of applications, according to one embodiment.
Figure 5:
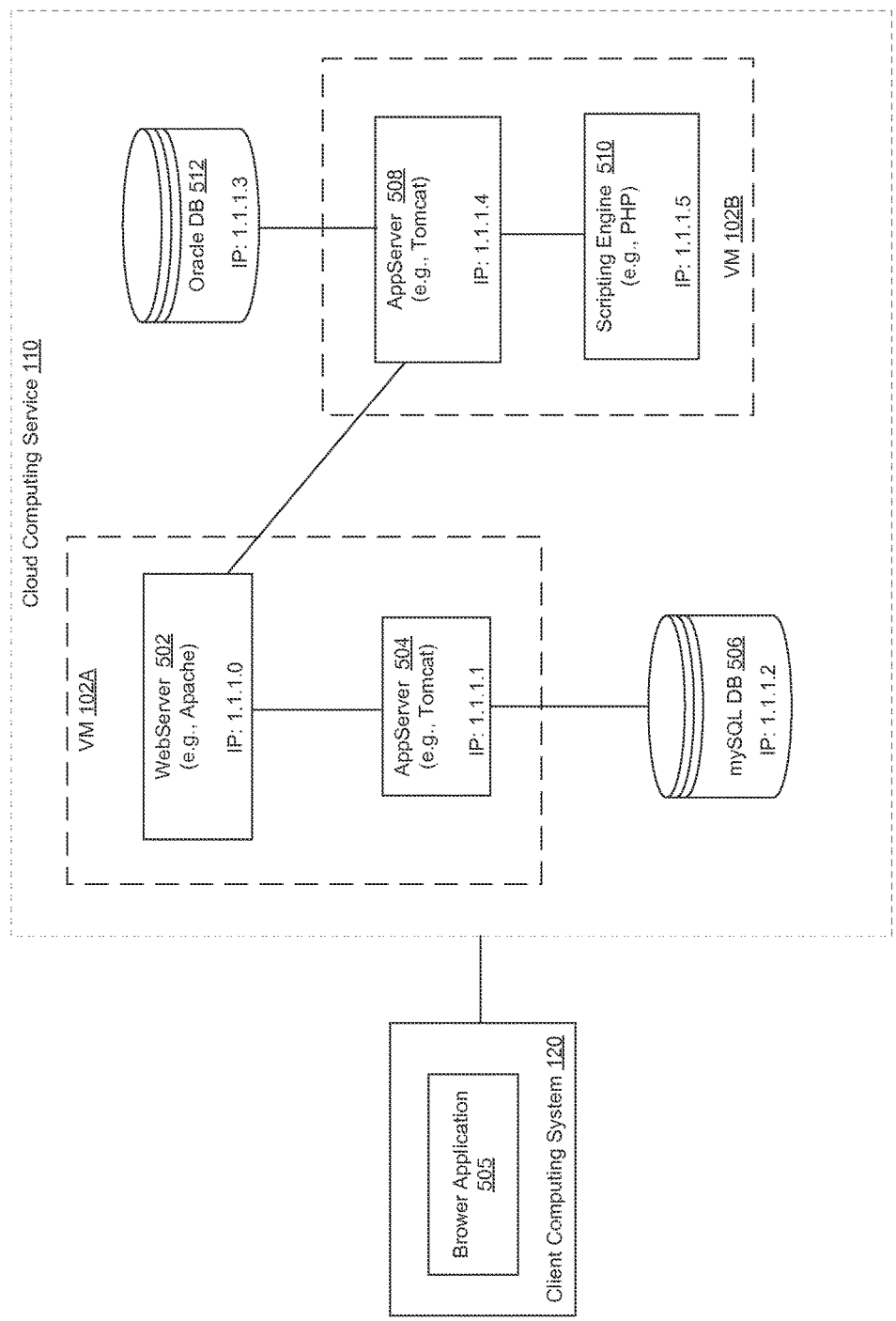
FIG. 5 illustrates an example deployment of computing instances in a computing environment for a multi-tier application, according to one embodiment.

FIG. 3 further illustrates an example of the whitelist agent 106 described relative to FIGS. 1 and 2, according to one embodiment. As shown, the whitelist agent 106 includes a discovery component 302, a configuration file component 304, and an enforcement component 306. In one embodiment, the discovery component 302 identifies application(s) deployed to a virtual computing instance (e.g., virtual machine, host machine with container(s), etc.). FIG. 5, described below, illustrates one reference example of applications deployed across virtual machines. In such a deployment, the discovery component 302 of a whitelist agent 106A can identify that WebServer 502 and/or AppServer 504 are deployed to VM 102A. The discovery component 302 can also identify that MySQL DB 506 provides support for WebServer 502 and AppServer 504 on VM 102A. Similarly, the discovery component 302 of a whitelist agent 106B can identify that AppServer 508 and Scripting Engine 510 are deployed to VM 102B, and that Oracle DB 512 provides support for applications on VM 102B.

Referring back to FIG. 3, in one embodiment, once the discovery component 302 identifies application(s) hosted on a VM, the configuration file component 304 inspects configuration file(s) (e.g., such as configuration file(s) 108) associated with the application(s) within the computing instance. In some embodiments, the computing instance can include a configuration file for every application within the computing instance. In other embodiments, the computing instance can include a configuration file for different groups of applications within the computing instance.

In one embodiment, the configuration file component 304 searches for a given set of configuration files within a computing instance in order to extract properties and configuration data associated with the operation of the application(s) within the computing instance. In general, the configuration file component 304 can identify any information regarding how an application(s) is configured to communicate with other application(s), including IP addresses and ports of the application(s), processes associated with the execution of the application(s), source/destination process endpoints, process hierarchy (e.g., parent process to child process), process path, command line arguments, user groups, and the like.

Using the reference example in FIG. 5, the configuration file component 304 (of whitelist agent 106A) can search "access.conf," "httpd.conf," and "srm.conf," which are configuration files associated with Apache WebServer 502. Within "httpd.conf," the configuration file component 304 can identify the hostname (e.g., "host.domain.com") of the computing instance on which the WebServer 502 runs, the type of WebServer 502 (e.g., whether the web server is started via an "inetd" service or is a standalone service), the port(s) on which the WebServer 502 uses to listen for client requests, user identifiers and groups allowed to use the WebServer's 502 services, internet protocol (IP) addresses the WebServer 502 listens to for requests, the type and/or number of child processes the Webserver 502 is allowed to create, the particular application(s) and/or the IP addresses and ports of the application(s) the WebServer 502 is configured to communicate with, and other information. In some cases, the configuration file component 304 can determine the relevant properties and/or configuration data to extract based on predefined knowledge of the configuration of the particular application(s).

In another embodiment, the configuration file component 304 can inspect and parse configuration files used in scripting environments used to instantiate and deploy a set of cloud based resources, e.g., using any available cloud formation scripting language used to build multi-tier environments. FIG. 5, for example, illustrates one such multi-tier environment that includes WebServer 502, AppServer 504, AppServer 508, Scripting Engine 510, Oracle DB 512, and MySQL DB 506, all of which may provide support for web browser application 505. Examples of scripting tools include DevOPs scripting tools, shell scripts, and the like. In this embodiment, the configuration file component 304 can parse the scripting configuration files, and extract metadata from the scripting configuration files in order to reconstruct the structure of the applications within the cloud computing service 110. Based on the extracted metadata, the configuration file component 304 can determine properties associated with network connectivity among the application(s).

In one embodiment, the configuration file component 304 determines what network traffic the application(s) is expected to generate, based on the information from the configuration file(s). The configuration file component 304 can determine whether a particular application or process is configured to communicate with at least one another application or process, whether on the same and/or different computing instance. Referring again to the reference example in FIG. 5, the configuration file component 304 (of whitelist agent 106A) can determine, based on inspecting configuration file(s), that WebServer 502 is configured to communicate with AppServer name: Tomcat 504 at AppServer address: "1.1.1.1" on AppServer port: 80 using TCP protocol, on the same VM instance 102A. Similarly, the configuration file component 304 can determine, based on inspecting configuration file(s), that WebServer 502 is configured to communicate with AppServer name: Tomcat 508 at AppServer address: "1.1.1.4" on AppServer port: 80 using TCP protocol, on a different VM instance 102B. The configuration file component 304 can determine that the generated network traffic from WebServer 502 to AppServers 502/508 is normal, for example, based on the particular name, address, port, protocol, etc., for AppServers 502/508 specified in the configuration file(s) for WebServer 502.

In another example, the configuration file component 304 can determine, based on inspecting configuration file(s), that a network communication that occurs rarely during operation of the application(s) is an expected network communication generated by the application(s). For example, in one reference case, the configuration file component 304 can determine, from inspecting configuration files (e.g., "ntp-.conf.") for a NTP client, that the NTP client is configured to communicate (e.g., one a day, once a week, etc.) with a NTP server in order to synchronize its clock. In this scenario, although the frequency of communication is low (compared to other generated network communication), the configuration file component 304 can determine from "ntp-.conf" that the generated NTP network communication to the NTP server is expected network traffic for the NTP client, and can recommend that such network communication be whitelisted. Doing so in this manner allows the whitelist agent(s) to identify rarely occurring network events that possibly would not be identified using network-based security controls (e.g., as network-based security controls would have to monitor network communication for a long time to capture the rare event). In addition, identifying rarely occurring network events in this manner reduces the amount of noise in the system, which can lower the generation of false positives.

In addition to inspecting configuration file(s), in one embodiment, the configuration file component 304 can identify additional network traffic expected patterns by inspecting network architecture, firewalls, network access control lists (ACLs), and the like. In some embodiments, the configuration file component 304 can let the application(s) operate for a period of time, and monitor the operation of the application(s) in order to determine the actual and/or expected network communication patterns among the application(s).

In one embodiment, the configuration file component 304 sends the information from the configuration file(s) to the policy management component 132 for construction of a network whitelist. In some embodiments, in addition to the information from the configuration file(s), the configuration file component 304 can send the information obtained from inspecting network ACLs, network architecture, monitoring activity, etc., to the policy management component 132 for construction of the whitelist. Once the policy management component 132 returns the whitelist, the enforcement component 306 uses the whitelist to evaluate network traffic generated and/or received by the application(s) on the computing instance. For example, in one embodiment, the enforcement component 306 can employ one or more kernel drivers to intercept inbound and outbound communications among the application(s). The enforcement component 306 can intercept the communications at the network/transport layers, e.g., at UDP, TCP/IP. Upon intercepting an inbound and/or outbound connection attempt, the enforcement component 306 compares properties of the connection (e.g., source IP/port, destination IP/port, protocol, source process, destination process, etc.) with entries on the whitelist and determines whether to raise an alert (e.g., to an administrator) and/or prevent the inbound or outbound connection, based on a host-based policy rule.

Referring to the example illustrated in FIG. 5, in one case, the enforcement component 306 (of whitelist agent 106A) can observe that "WebServer name: Apache 502" at "source IP: 1.1.1.0" on "port 80" is attempting to open a connection with "AppServer name: TomCat 508" at "destination IP: 1.1.1.4" on "port 80" (using protocol TCP). Upon observing this attempt, the enforcement component 306 can compare the properties of the communication attempt to the constructed whitelist 502 to determine if the attempted network communication is whitelisted. If so, the enforcement component 306 can allow the network communication attempt to proceed. On the other hand, if the enforcement component 306 determines that the network communication attempt deviates from the whitelist in any manner (e.g., any of the source/destination IP, source/destination process, source/destination port, protocol, etc., are not on the whitelist), the enforcement component 306 can prevent the network communication attempt and/or raise an alert to an administrator.

Accordingly, by using host-based security controls (e.g., such as the whitelist agent(s)) to inspect configuration files to identify expected patterns of communication between application(s) on the same computing instance, or across computing instances, the techniques presented herein can reduce the number of false positives generated (e.g., compared to traditional techniques), detect communications associated with data exfiltration techniques, provide enhanced host-based security controls for enterprises that use cloud-based services, etc.

Figure 4:
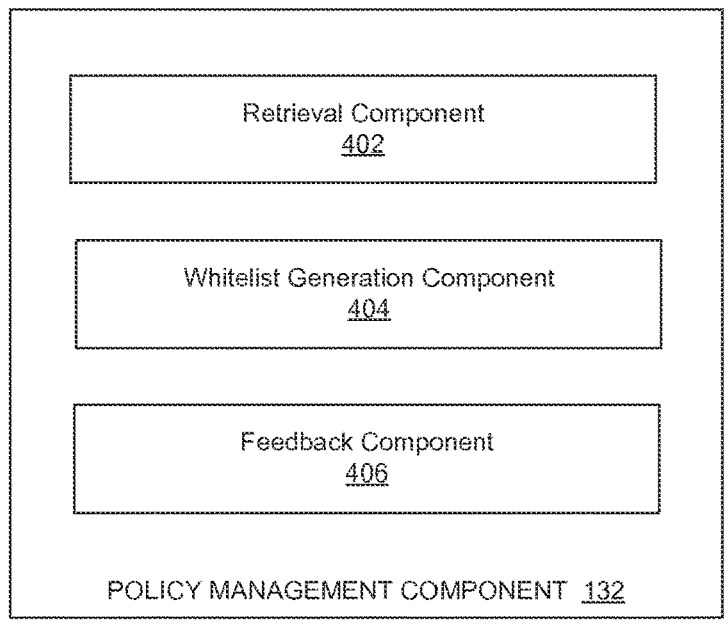
FIG. 4 illustrates an example tool configured to construct a network whitelist, according to one embodiment.

FIG. 4 further illustrates an example of the policy management component 132 described relative to FIGS. 1 and 2, according to one embodiment. As shown, the policy management component 132 includes a retrieval component 402, whitelist generation component 404, and feedback component 406. In one embodiment, the retrieval component 402 is configured to receive information from configuration file(s) and/or other information (described above) from each whitelist agent(s) 106.

In one embodiment, the whitelist generation component 404 generates a whitelist (e.g., such as that illustrated in FIG.

6) based on the configuration file information. The whitelist generation component 404 can generate the whitelist according to a set of rules, which can be predetermined by an analyst, determined from behavioral algorithms (e.g., with machine learning), etc. In some embodiments, the generated whitelist can whitelist a subset of the network traffic identified from the configuration files, network traffic patterns obtained from monitoring the applications, etc. In some embodiments, the generated whitelist is a five-tuple whitelist that includes source IP/port, destination IP/port, and protocol. In some embodiments, the generated whitelist is a process-aware whitelist that includes the information associated with the five tuple whitelist in addition to process level details, e.g., source/destination process endpoints, process hierarchy (e.g., parent process to child process), process path, and the like. Generating a process-aware whitelist allows the whitelist agents to determine whether processes from applications are allowed to communicate with processes of other applications (e.g., even if other properties of the network communication attempt, such as IP, port, etc. are whitelisted). As such, the techniques presented herein can provide improved protection against data exfiltration techniques, e.g., compared to techniques that are only able to capture sender and destination IP/port.

In one embodiment, once the whitelist generation component 404 generates the whitelist, the whitelist generation component 404 or feedback component 406 sends the whitelist to an administrator (e.g., end-user) for validation. The feedback component 406 can receive feedback from the administrator, and based on the feedback, incorporate the feedback (if any) into the whitelist (e.g., by adding entries, removing entries, and the like) or send the whitelist back to the whitelist agent(s) 106. By allowing administrators to provide feedback, the techniques presented herein allow whitelist agents to prevent network traffic that the administrator suspects (or knows) to be potentially harmful and/or prevents whitelist agents from raising alerts for network traffic that the administrator expects to be generated from the applications (which reduces the number of false-positive alerts).

FIG. 5 illustrates an example deployment of computing instances in a computing environment for a multi-tier application, according to one embodiment. As shown, in this embodiment, one or more applications (e.g., web server, application server, databases, scripting engines, etc.) can be deployed across one or more VMs 102A and 102B in order to support a multi-tier web application (e.g., such as an e-commerce website application) requested via browser application 505. In particular, a WebServer 502 and AppServer 504 can be deployed to VM 102A, and AppServer 508 and Scripting Engine 510 can be deployed to VM 102B. In this particular embodiment, whitelist agent 106A can discover that WebServer 502 and AppServer 504 are deployed to VM 102A, and whitelist agent 106B can discover that AppServer 508 and Scripting Engine 510 are deployed to VM 102B. Each whitelist agent 106A and 106B can inspect configuration file(s) 108A and 108B, respectively, to identify properties and/or configuration data (e.g., such as processes, source IP/port, destination IP/port, etc.) associated with network communication among the applications. For example, upon expecting the configuration file(s) 108A, whitelist agent 106A can determine that WebServer 502 is configured to interact with AppServer 504 and AppServer 508, and that AppServer 504 is configured to interact with WebServer 502 and MySQL database (DB) 506. Similarly, upon expecting the configuration file(s) 108B, whitelist agent 106B can determine that AppServer 508 is configured to interact with WebServer 502, Oracle DB 512, and Scripting Engine 510, and that Scripting Engine 510 is configured to interact with AppServer 508.

The whitelist agents 106A and 106B (associated with VM 102A and VM 102B, respectively) can send the information from the configuration file(s) to the policy management component 132, which uses the information to construct a network whitelist. For example, as shown in FIG. 6, the policy management component 132 can construct the network whitelist 600, based on configuration file(s) for the applications deployed in VM 102A and 102B. As shown, the network whitelist 600 includes information fields for source process 602, source IP 604, source port 606, destination process 608, destination IP 610, destination port 612 and protocol 614. Once the policy management component 132 constructs the network whitelist 600, the policy management component returns the network whitelist 600 to the whitelist agents 106A and 106B, which use the network whitelist 600 to monitor network traffic.

Note, however, that FIG. 5 illustrates merely one possible arrangement of applications that can be deployed across one or more computing instances, and FIG. 6 illustrates merely one possible network whitelist that can be constructed based on configuration files. More generally, one of ordinary skill in the art will recognize that the techniques presented herein can be used in other embodiments of cloud computing environments, on-premises environments, etc. Further, one of ordinary skill in the art will recognize that the techniques presented herein can be used to generate network whitelists with more or less information fields.

Figure 7:
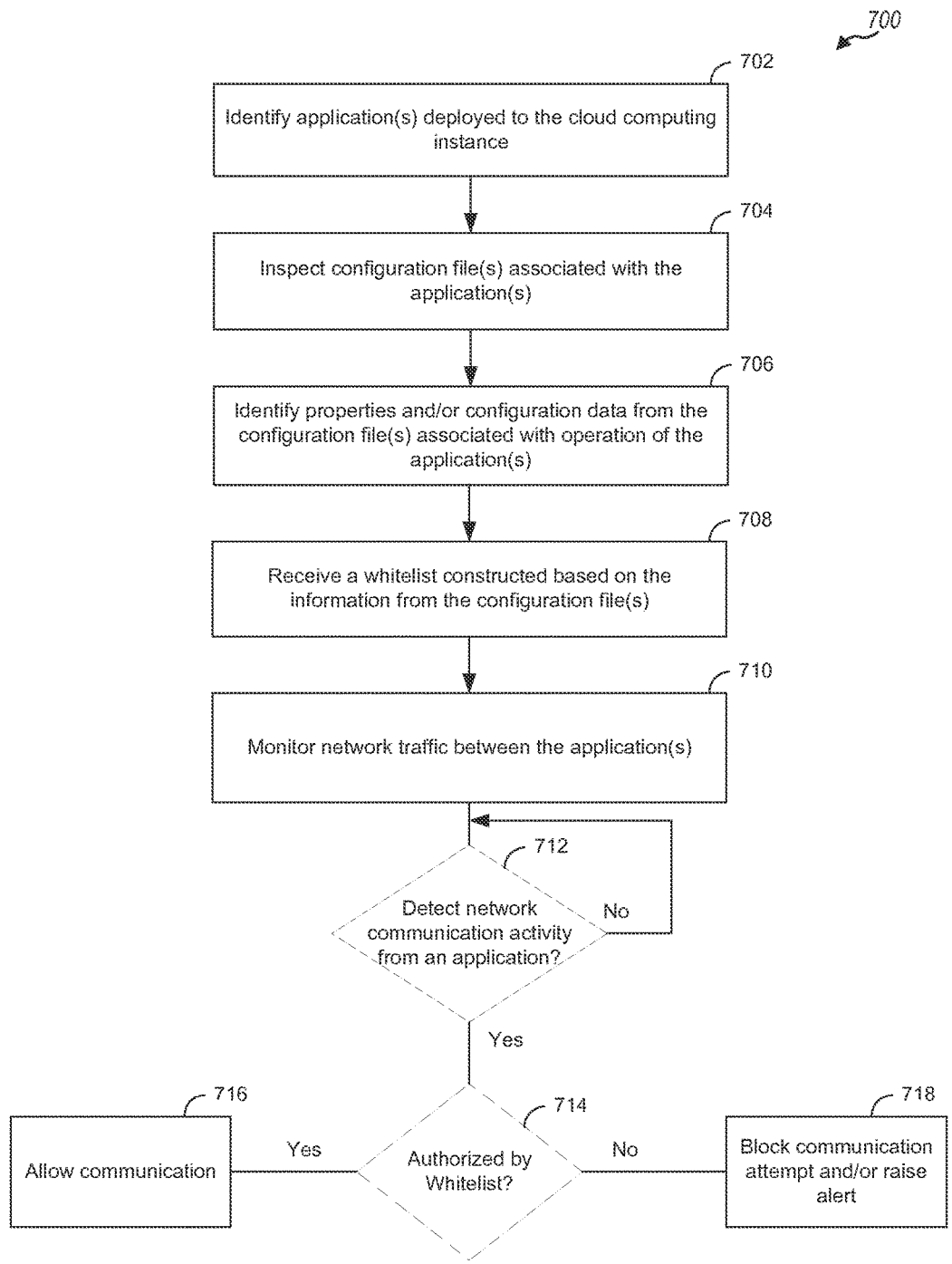
FIG. 7 illustrates a method for using host-based security controls to identity communication patterns for construction of a network whitelist, according to one embodiment.

FIG. 7 illustrates a method 700 for using a network whitelist to monitor network communications. The method 700 can be performed by each whitelist agent 106 deployed to a computing instance. As shown, the method 700 begins at step 702, where the whitelist agent 106 identifies application(s) deployed to the cloud computing instance. At step 704, the whitelist agent 106 inspects configuration file(s) associated with the application(s). At step 706, the whitelist agent 106 identifies properties and/or configuration data (configuration settings) from the configuration file(s) associated with operation of the application(s).

At step 708, the whitelist agent 106 receives a whitelist constructed based on the information from the configuration file(s). For example, as mentioned above, the whitelist agent 106 can send the information from the configuration file(s) to a policy management server, which constructs the whitelist, based in part, on the information. Once the whitelist agent 106 receives the whitelist, the whitelist agent 106 monitors network traffic between application(s).

At step 712, the whitelist agent 106 determines whether there is any network communication activity between one of the applications. If so, the whitelist agent 106 determines whether the network communication is authorized by an entry on the whitelist (step 714). If not, the whitelist agent 106, at step 718, blocks the network communication activity and/or raises an alert to an administrator. If, on the other hand, the whitelist agent 106 determines, at step 714, that the network communication activity is authorized by an entry on the whitelist, the whitelist agent 106 allows the network communication activity to proceed (step 716).

Figure 8:
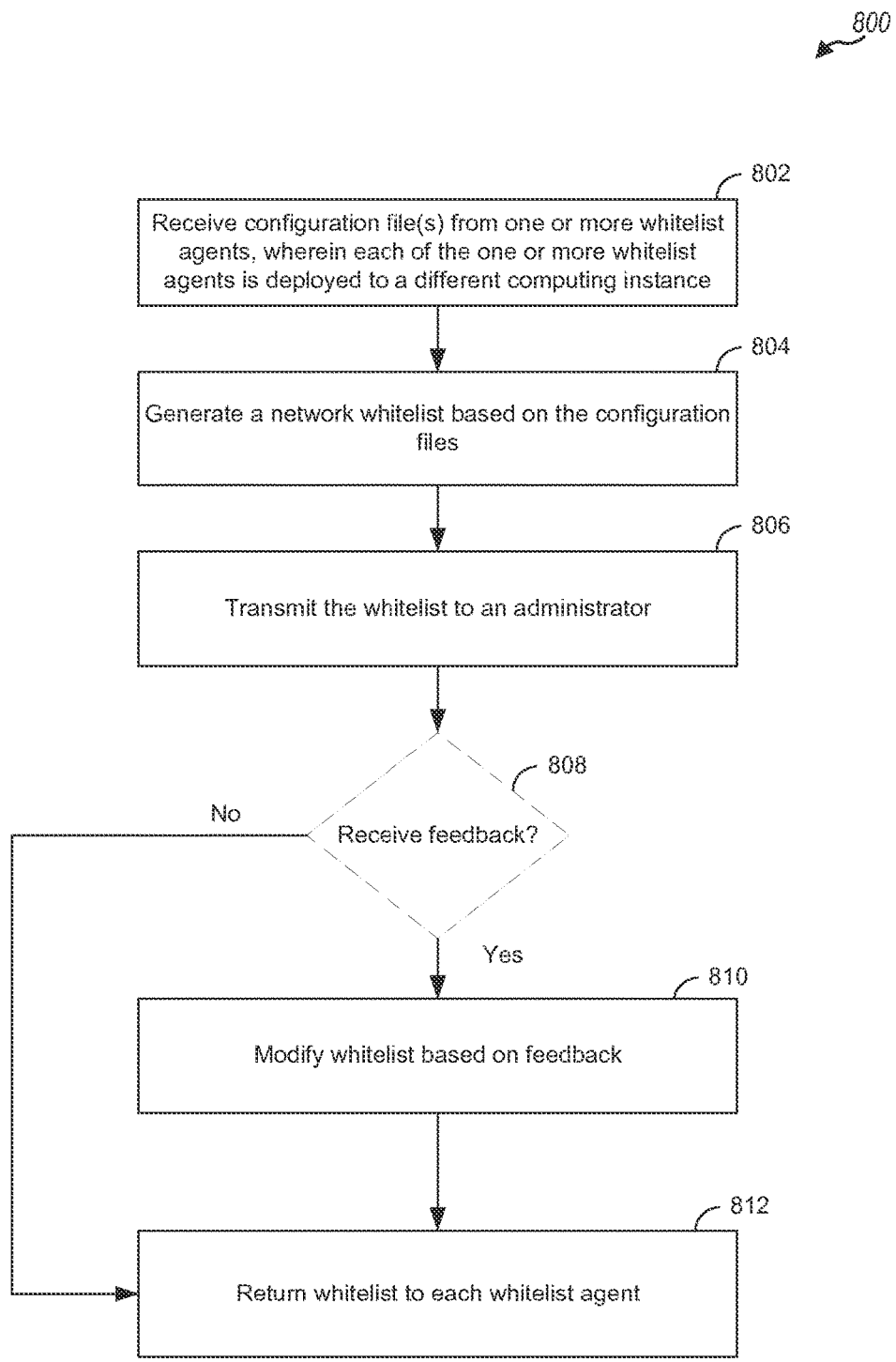
FIG. 8 illustrates a method for constructing a network whitelist using host-based security controls, according to one embodiment.

FIG. 8 illustrates a method 800 for constructing a network whitelist using host-based security controls, according to one embodiment. As shown, the method begins at step 802, where a policy management component 132 receives configuration file(s) from one or more whitelist agents, wherein each of the one or more whitelist agents is deployed to a different computing instance. At step 804 the policy management component 132 generates a network whitelist based on the configuration files. For example, the whitelist specifies expected network communications activity (based on the configuration files) for the applications. At step 806, the policy management component 132 transmits the whitelist to an administrator. At step 808, the policy management component determines whether any feedback has been received. If so, the policy management component 132 modifies the whitelist based on the feedback (step 810). At step 812, the policy management component 132 returns the whitelist to each whitelist agent.

Figure 9:
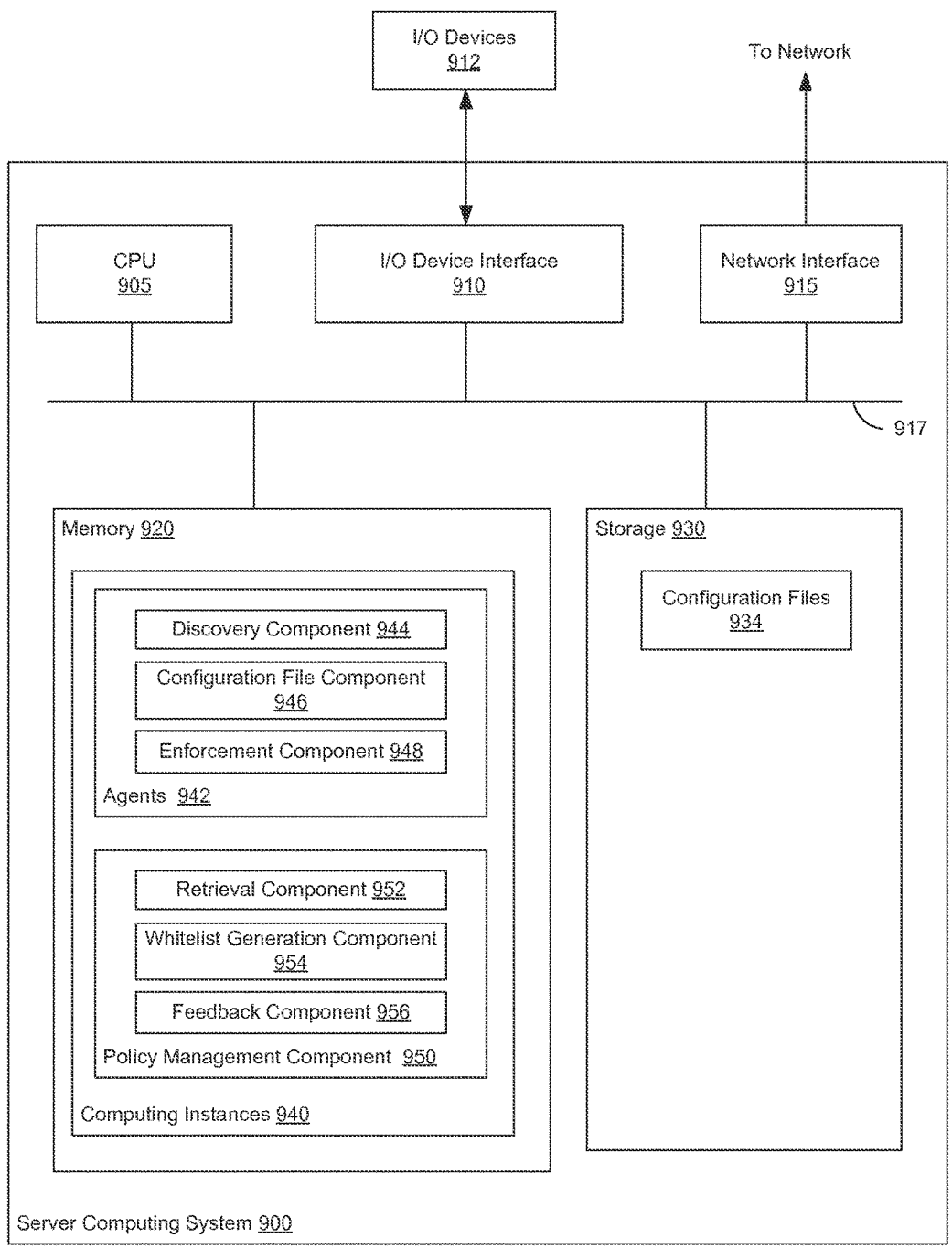
FIG. 9 illustrates an example computing system configured to construct a network whitelist, according to one embodiment.

FIG. 9 illustrates an example server computing system 900 configured to construct a network whitelist, according to one embodiment. As shown, the server computing system 900 includes, without limitation, a central processing unit (CPU) 905, a network interface 915, a memory 920, and storage 930, each connected to a bus 917. The server computing system 900 may also include an I/O device interface 910 connecting I/O devices 912 (e.g., keyboard, display, mouse devices, etc.) to server computing system 900. Further, in context of the present disclosure, the computing elements shown in the server computing system 900 may correspond to a physical computing system (e.g., a system in an enterprise network).

CPU 905 retrieves and executes programming instructions stored in memory 920 as well as stores and retrieves application data residing in the storage 930. The bus 917 is used to transmit programming instructions and application data between CPU 905, I/O devices interface 910, storage 930, network interface 915, and memory 920. Note CPU 905 is included to be representative of a single CPU, multiple CPUs, a single CPU having multiple processing cores, and the like. Memory 920 is generally included to be representative of a random access memory. Storage 930 may be a disk drive storage device. Storage 930 includes configuration files 934. Although shown as a single unit, storage 930 may be a combination of fixed and/or removable storage devices, such as fixed disc drives, removable memory cards, or optical storage, network attached storage (NAS), or a storage area-network (SAN).

In one embodiment, the server computing system 900 is an example of a computing device deployed within an on-premises environment, such as data-center, private cloud, etc. In one embodiment, the server computing system 900 is an example of a computing device deployed in a cloud computing environment (e.g., public cloud). Illustratively, memory 920 includes a plurality of computing instances 940. In one embodiment, computing instances 940 are a plurality of virtual machines. In another embodiment, computing instances 940 are containers (e.g., in a Docker environment). Each one of the computing instances includes a whitelist agent 942. The whitelist agent 942 includes a discovery component 944, configuration file component 946, and an enforcement component 948.

In one embodiment, the discovery component 944 is configured to identify application(s) deployed to the respective computing instance 940. The configuration file component 946 is configured to inspect configuration file(s) for the application(s), identify configuration settings (e.g., properties and/or configuration data) from the configuration file(s). Upon receiving a whitelist, the enforcement component 948 is configured to monitor network communications and raise an alert, prevent the communication, etc., upon detecting a network communication attempt that is not authorized by the whitelist.

In one embodiment, the memory 940 also includes a policy management component 950, which can be deployed to one of the computing instances 940. As shown, the policy management component 950 includes retrieval component 952, whitelist generation component 954 and feedback component 956. The retrieval component 952 is configured to retrieve configuration information from each whitelist agent deployed to each computing instance 940. The whitelist generation component 954 is configured to generate a whitelist based, in part, on the information. The feedback component 956 is configured to receive feedback from an administrator and incorporate the feedback (if any) into the whitelist. Once approved, the feedback component 956 can push the generated whitelist to each whitelist agent for enforcement.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   identifying at least a first application hosted on a computing system;
   inspecting one or more configuration files associated with the first application to identify one or more configuration settings that specify how the first application communicates with one or more second applications; and
   generating a process-aware whitelist that specifies expected network communications activity for the first application, based on the configuration settings, wherein an entry in the process-aware whitelist specifies a process path for an authorized network communication, wherein the process path includes a source process of the authorized network communication and a destination process of the authorized network communication, and wherein the entry in the process-aware whitelist further specifies:
   a process hierarchy for the source process of the authorized network communication,
   a process hierarchy for the destination process of the authorized network communication, and
   at least one of a command line argument associated with the first application or a user group associated with a user of the first application.

2. The method of claim 1, wherein the process-aware whitelist identifies, for the first application, at least one of network addresses, ports, network protocol or times for authorized network communications between the first application and one or more of the second applications.

3. The method of claim 2, further comprising:
   observing network communication activity between the first application and one of the second applications; and
   evaluating the network communication activity for unauthorized communications, based on the process-aware whitelist.

4. The method of claim 3, wherein, upon determining that the observed network communication activity does not correspond to an expected network communication engaged in by the first application, the method further comprises at least one of:
   blocking the network communication activity between the first application and the one of the second applications; or
   notifying an administrator to the network communication activity between the first application and the one of the second applications.

5. The method of claim 1, further comprising:
   identifying at least a first pattern of network communication activity engaged in by the first application; and
   generating the process-aware whitelist further based on the first pattern of network communication activity.

6. The method of claim 1, wherein the one or more configuration settings specify at least one of an internet protocol (IP) address and port that the first application listens to, an IP address and port of one or more of the second applications that the first application is configured to communicate with, one or more processes of the first application configured to communicate with one or more of the second applications, or user identifiers allowed to use the one or more processes of the first application.

7. The method of claim 1, wherein the computing system comprises one or more virtual machines, and wherein the first application is deployed to a first virtual machine of the one or more virtual machines.

8. A non-transitory computer-readable storage medium storing instructions, which, when executed on a processor, perform an operation, the operation comprising:
   identifying at least a first application hosted on a computing system;
   inspecting one or more configuration files associated with the first application to identify one or more configuration settings that specify how the first application communicates with one or more second applications; and
   generating a process-aware whitelist that specifies expected network communications activity for the first application, based on the configuration settings, wherein an entry in the process-aware whitelist specifies a process path for an authorized network communication, wherein the process path includes a source process of the authorized network communication and a destination process of the authorized network communication, and wherein the entry in the process-aware whitelist further specifies:
      a process hierarchy for the source process of the authorized network communication,
      a process hierarchy for the destination process of the authorized network communication, and
      at least one of a command line argument associated with the first application or a user group associated with a user of the first application.

9. The non-transitory computer-readable storage medium of claim 8, wherein the process-aware whitelist identifies, for the first application, at least one of network addresses, ports, network protocol or times for authorized network communications between the first application and one or more of the second applications.

10. The non-transitory computer-readable storage medium of claim 9, the operation further comprising:
    observing network communication activity between the first application and one of the second applications; and
    evaluating the network communication activity for unauthorized communications, based on the process-aware whitelist.

11. The non-transitory computer-readable storage medium of claim 10, wherein, upon determining that the observed network communication activity does not correspond to an expected network communication engaged in by the first application, the operation further comprises at least one of:
    blocking the network communication activity between the first application and the one of the second applications; or
    notifying an administrator to the network communication activity between the first application and the one of the second applications.

12. The non-transitory computer-readable storage medium of claim 8, the operation further comprising:
    identifying at least a first pattern of network communication activity engaged in by the first application; and
    generating the process-aware whitelist further based on the first pattern of network communication activity.

13. The non-transitory computer-readable storage medium of claim 8, wherein the one or more configuration settings specify at least one of an internet protocol (IP) address and port that the first application listens to, an IP address and port of one or more of the second applications that the first application is configured to communicate with, one or more processes of the first application configured to communicate with one or more of the second applications, or user identifiers allowed to use the one or more processes of the first application.

14. The non-transitory computer-readable storage medium of claim 8, wherein the computing system comprises one or more virtual machines, and wherein the first application is deployed to a first virtual machine of the one or more virtual machines.

15. A system comprising:
    a processor; and
    a memory containing a program, which when executed on the processor, performs an operation, the operation comprising:
       identifying at least a first application hosted on a computing system;
       inspecting one or more configuration files associated with the first application to identify one or more configuration settings that specify how the first application communicates with one or more second applications; and
       generating a process-aware whitelist that specifies expected network communications activity for the first application, based on the configuration settings, wherein an entry in the process-aware whitelist specifies a process path for an authorized network communication, wherein the process path includes a source process of the authorized network communication and a destination process of the authorized network communication, and wherein the entry in the process-aware whitelist further specifies:
          a process hierarchy for the source process of the authorized network communication,
          a process hierarchy for the destination process of the authorized network communication, and
          at least one of a command line argument associated with the first application or a user group associated with a user of the first application.

16. The system of claim 15, wherein the process-aware whitelist identifies, for the first application, at least one of network addresses, ports, network protocol or times for authorized network communications between the first application and one or more of the second applications.

17. The system of claim 16, the operation further comprising:
    observing network communication activity between the first application and one of the second applications; and
    evaluating the network communication activity for unauthorized communications, based on the process-aware whitelist.

18. The system of claim 17, wherein, upon determining that the observed network communication activity does not correspond to an expected network communication engaged in by the first application, the operation further comprises at least one of:

blocking the network communication activity between the first application and the one of the second applications; or notifying an administrator to the network communication activity between the first application and the one of the second applications.

19. The system of claim 15, wherein the one or more configuration settings specify at least one of an internet protocol (IP) address and port that the first application listens to, an IP address and port of one or more of the second applications that the first application is configured to communicate with, one or more processes of the first application configured to communicate with one or more of the second applications, or user identifiers allowed to use the one or more processes of the first application.

20. The system of claim 15, wherein the computing system comprises one or more virtual machines, and wherein the first application is deployed to a first virtual machine of the one or more virtual machines.

* * * * *